(12) United States Patent
Kalhous et al.

(10) Patent No.: US 10,087,672 B2
(45) Date of Patent: Oct. 2, 2018

(54) HANDS-FREE ACCESS CONTROL SYSTEM FOR A CLOSURE OF A VEHICLE

(71) Applicant: GM Global Technology Operations LLC, Detroit, MI (US)

(72) Inventors: Amanda J. Kalhous, Ajax (CA); Norman J. Weigert, Whitby (CA); Doru N. Serban, Richmond Hill (CA); Kathiravetpillai Kandiah, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/050,112

(22) Filed: Feb. 22, 2016

(65) Prior Publication Data

US 2017/0241188 A1 Aug. 24, 2017

(51) Int. Cl.
| | |
|---|---|
| *E05F 15/77* | (2015.01) |
| *E05F 15/76* | (2015.01) |
| *B60J 5/10* | (2006.01) |
| *G05D 1/00* | (2006.01) |
| *E05F 15/40* | (2015.01) |

(52) U.S. Cl.
CPC ............ *E05F 15/76* (2015.01); *B60J 5/10* (2013.01); *E05F 15/40* (2015.01); *E05F 15/77* (2015.01); *G05D 1/0022* (2013.01); *E05Y 2400/45* (2013.01); *E05Y 2400/85* (2013.01); *E05Y 2400/856* (2013.01); *E05Y 2900/532* (2013.01)

(58) Field of Classification Search
CPC ............ E05F 15/76; E05F 15/40; E05F 15/77
See application file for complete search history.

(56) References Cited

U.S. PATENT DOCUMENTS

| | | | |
|---|---|---|---|
| 2010/0075655 A1* | 3/2010 | Howarter ............ | B60R 25/2009 455/420 |
| 2010/0251519 A1* | 10/2010 | Duffy ...................... | E05D 5/062 16/304 |
| 2012/0221173 A1* | 8/2012 | Ampunan ............. | B60R 16/037 701/2 |
| 2013/0304278 A1* | 11/2013 | Chen ....................... | G06F 17/00 701/2 |
| 2013/0332033 A1* | 12/2013 | Debouk .................. | B60R 16/02 701/49 |

(Continued)

*Primary Examiner* — Jess G Whittington
(74) *Attorney, Agent, or Firm* — David Willoughby; Reising Ethington P.C.

(57) ABSTRACT

An access control system for a vehicle includes a rear closure and a system that controls movement of the rear closure between closed and open positions. The control system including a controller and a wireless communication module having a wireless interface configured for short range wireless communication. The controller receives an actuation signal requesting transition of the rear closure to an open position from a mobile communication device carried by a vehicle user. The controller then determines when the user enters authentication and actuation zones proximate the vehicle via communication between the wireless communication module and a short range wireless communication device carried by the user. One the user is within the actuation zone, the controller generates a rear closure control signal configured to cause the rear closure to move from the closed position to the open position.

20 Claims, 2 Drawing Sheets

(56) References Cited

U.S. PATENT DOCUMENTS

| | | | |
|---|---|---|---|
| 2014/0207344 A1* | 7/2014 | Ihlenburg | E05F 15/73 701/49 |
| 2014/0274013 A1* | 9/2014 | Santavicca | H04W 4/008 455/418 |
| 2015/0161834 A1* | 6/2015 | Spahl | G07C 9/00111 340/5.61 |
| 2015/0187146 A1* | 7/2015 | Chen | G07C 5/008 701/31.5 |
| 2015/0247353 A1* | 9/2015 | Gupta | E05F 15/77 701/2 |
| 2015/0287257 A1* | 10/2015 | Thompson | G07C 9/00309 340/5.72 |
| 2016/0048249 A1* | 2/2016 | Chen | G06F 3/011 701/2 |
| 2016/0059827 A1* | 3/2016 | Uddin | B60R 25/245 701/2 |
| 2016/0083995 A1* | 3/2016 | Dezorzi | E05F 15/73 340/5.72 |
| 2017/0199522 A1* | 7/2017 | Li | G05D 1/0033 |
| 2017/0204651 A1* | 7/2017 | Gussen | E05F 15/77 |
| 2017/0345241 A1* | 11/2017 | Santavicca | H04M 1/7253 |

* cited by examiner

HANDS-FREE ACCESS CONTROL SYSTEM FOR A CLOSURE OF A VEHICLE

TECHNICAL FIELD

The present disclosure relates to an access control system for a vehicle. In particular, the present disclosure relates to a system that enables hands-free opening of a rear closure of the vehicle based on the approach of a user to the vehicle.

BACKGROUND

Many modern vehicles include systems that enable an individual to open or close of doors and other access points on a vehicle without the use of the individual's hands. Such systems offer a convenience to the user in the event that the user's hands are otherwise occupied by, for example carrying items. In the case of vehicle rear closures, one conventional access control system involves detecting a kicking movement of a user's foot underneath the rear of the vehicle and opening the rear closure in response. This system, however, is relatively expensive to install in the vehicle and integrate with other vehicle components. Further, while the system enables a hands free opening of the rear closure, the system can still be difficult to use because it requires the user to balance on one foot while making a sweeping motion with the other—an action that can be difficult when the user is in certain footwear (e.g., high heeled shoes) or carrying certain items (e.g., a large number of bags of groceries).

SUMMARY

According to an embodiment of the invention, there is provided an access control system for a vehicle including a rear closure that fits over a rear opening of a vehicle and that is configured to assume a closed position preventing access to the vehicle through the rear opening and an open position permitting access to the vehicle through the rear opening. The access control system further includes a system that controls movement of the rear closure between the closed position and the open position. The system includes a wireless communication module having a wireless interface configured for short range wireless communication and a controller. The controller is configured to receive an actuation signal from a mobile communication device carried by a user of the vehicle, the actuation signal requesting transition of the rear closure from the closed position to the open position. The controller is further configured to determine that the user has entered an authentication zone located within an authentication distance from the vehicle and to determine that the user has entered an actuation zone located within an actuation distance from the vehicle, the actuation distance being less than the authentication distance. The controller is further configured to generate a rear closure control signal once the user is determined to be within the actuation zone, the rear closure control signal configured to cause the rear closure to move from the closed position to the open position. The controller is configured to carry out at least one of determining that the user has entered the authentication zone and determining that the user had entered the actuation zone via communication between the wireless communication module and a short range wireless communication device carried by the user.

According to another embodiment of the invention, there is provided an access control system for a vehicle including a rear closure that fits over a rear opening of a vehicle and that is configured to assume a closed position preventing access to the vehicle through the rear opening and an open position permitting access to the vehicle through the rear opening. The access control system further includes a system that controls movement of the rear closure between the closed position and the open position. The system includes a wireless communication module having a wireless interface configured for short range wireless communication and a controller. The controller is configured to receive an actuation signal from a mobile communication device carried by a user of the vehicle, the actuation signal requesting transition of the rear closure from the closed position to the open position. The controller is further configured to determine that the user has entered an authentication zone located within an authentication distance from the vehicle and to generate an alert signal to a vehicle subsystem once the user is within the authentication zone. The vehicle subsystem is configured to produce an audio or visual alert and the alert signal configured to cause the vehicle subsystem to generate the audio or visual alert. The controller is further configured to monitor for a cancellation signal generated by the mobile communication device while the mobile communication device is in the authentication zone and to determine that the user has entered an actuation zone located within an actuation distance from the vehicle, the actuation distance being less than the authentication distance. The controller is further configured to generate, in the absence of the cancellation signal, a rear closure control signal once the user is determined to be within the actuation zone, the rear closure control signal configured to cause the rear closure to move from the closed position to the open position. The controller is configured to carry out at least one of determining that the user has entered the authentication zone and determining that the user had entered the actuation zone via communication between the wireless communication module and a short range wireless communication device carried by the user.

According to another embodiment of the invention, there is provided an access control system for a vehicle including a rear closure that fits over a rear opening of a vehicle and that is configured to assume a closed position preventing access to the vehicle through the rear opening and an open position permitting access to the vehicle through the rear opening. The system further includes a collision avoidance system configured to determine whether an object is located in the path of movement of the rear closure between the closed position and open position. The access control system further includes a system that controls movement of the rear closure between the closed position and the open position. The system includes a wireless communication module having a wireless interface configured for short range wireless communication and a controller. The controller is configured to receive an actuation signal from a mobile communication device carried by a user of the vehicle, the actuation signal requesting transition of the rear closure from the closed position to the open position. The controller is further configured to determine that the user has entered an authentication zone located within an authentication distance from the vehicle and determine that the user has entered an actuation zone located within an actuation distance from the vehicle, the actuation distance less than the authentication distance. The controller is further configured to receive a warning signal from the collision avoidance system if the object is in the path of movement of the rear closure from the closed position to the open position and to generate, in the absence of the warning signal, a rear closure control signal once user is determined to be within the actuation zone, the rear closure control signal configured to cause the rear closure to move from the closed position to the open position. The controller is configured to carry out at least one of determining that the user has entered the authentication zone and determining that the user had entered the actuation zone via communication between the wireless communication module and a short range wireless communication device carried by the user.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The access control system described below provide a means for controlling access to a vehicle. In particular, the system enables hands-free opening of a rear closure of the vehicle based on the approach of a user to the vehicle. In this manner, the system avoids the need for an individual to use their hands or feet to open the rear closure thereby allowing the user to avoid difficult balancing actions and retain full use of their hands and feet for other tasks.

Figure 1:
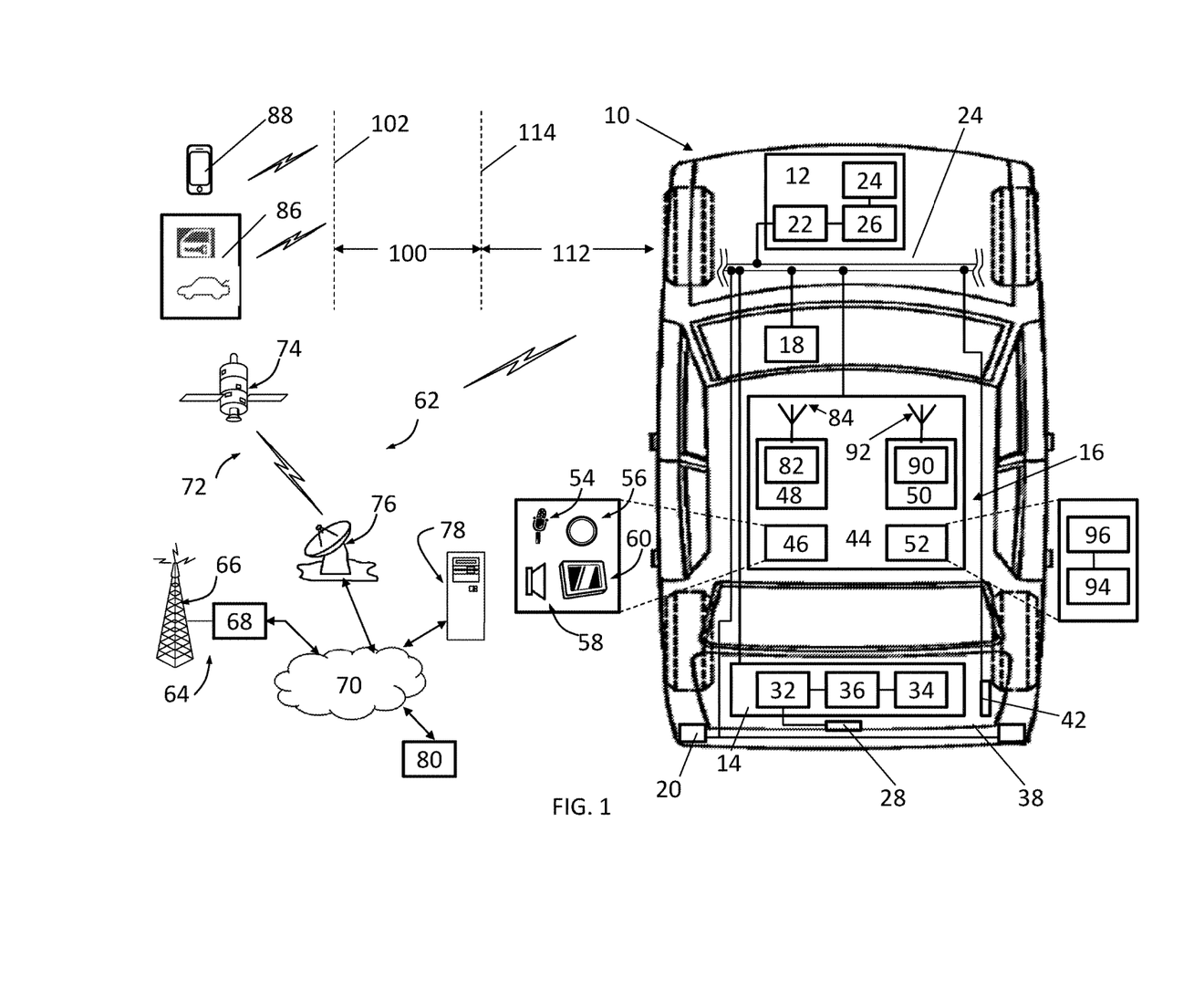
FIG. 1 is a schematic drawing illustrating a vehicle incorporating one embodiment of an access control system in accordance with the present teachings.

Referring now to the drawings wherein like reference numerals are used to identify identical components in the various views, FIG. 1 illustrates a vehicle 10 incorporating one embodiment of an access control system in accordance with the present teachings. Vehicle 10 is depicted in the illustrated embodiment as a passenger car, but it should be appreciated that the access control system disclosed herein could be used or implemented in a wide variety of vehicles including trucks, sports utility vehicles (SUVs), recreational vehicles (RVs), etc. Vehicle 10 may include a variety of vehicle subsystems including, but not limited to, subsystems used to control vehicle 10 such as body control module 12 and collision avoidance system 14 and subsystems used to provide services to occupants of vehicle 10 such as a navigation system (not shown) or infotainment system (not shown). In accordance with the present teachings, vehicle 10 may further include an access control system 16 that controls access to vehicle 10 through a rear opening of vehicle 10.

Body control module 12 controls various electronic devices and systems within vehicle 10. Body control module 12 may control, for example, power locks for doors and rear closures, power windows, windshield wipers, remote start systems, and cruise control systems, and an information display panel among other devices and systems. In accordance with one aspect of the present teachings, body control module 12 may control various devices and systems such as a horn 18 or exterior lights 20 (e.g. daytime running lamps) that can be used to produce an audio or visual alert to individuals outside of vehicle 10 during use of access control system as discussed in greater detail hereinbelow. Body control module 12 may include an input/output interface 22 configured to receive input signals from individual sensors and other control modules and generate output signals for use in controlling various devices and systems within vehicle 10. Interface 22 may receive and transmit signals over dedicated conductors or over a general purpose vehicle communications bus 24. Body control module 12 may further include an electronic memory device 26 that stores input data, look up tables and other data structures, and software programs and an electronic processing device 28 (e.g., a microprocessor, a microcontroller, an application specific integrated circuit (ASIC), etc.) that executes instructions for software, firmware, programs, algorithms, scripts, etc. that are stored in memory device 26. Although a body control module 12 is described herein for use in controlling horn 18 and/or exterior lights 20 for a specified purpose, it should be understood that both horn 18 and exterior lights 20 may have their own independent control modules that respond to specific inputs and generate specific outputs used in controlling horn 18 and exterior lights 20 and that access control system 16 may work with body control module 12 or work directly with the control modules for horn 18 and/or exterior lights 20 to generate the audio to visual alerts described hereinbelow.

Collision avoidance system 14 detects and attempts to mitigate or avoid collisions with objects external to vehicle 10. In accordance with the present teachings, system 14 may comprise a rear park assist system, a side or rear object detection system, or rear automatic braking system that provides information to access control system 16 regarding potential obstructions that may be encountered when accessing vehicle 10. System 14 may include one or more sensors 28 and a controller 30. Sensors 28 detect characteristics of objects external to the vehicle (e.g., other vehicles, guardrails, etc.) including the presence or absence of such objects, the position or change in position of such objects, and movements of such objects. In the illustrated embodiment, sensor 28 may be used to detect the presence, position or movement of vehicles or other objects in the path of movement of a rear closure of vehicle 10. In the case of a moving object, sensor 28 may generate signals indicative of the position, velocity and/or acceleration of the object. The information conveyed by the signals may be absolute in nature (e.g., a velocity or acceleration of the object that is relative to ground) or relative in nature (e.g., a relative velocity or acceleration that is a difference between the velocities or accelerations of vehicle 10 and the object). Sensor 28 may comprise a single sensor a combination of sensors and may comprise a light detection and ranging (LIDAR) device, ultrasonic device, radio detection and ranging (RADAR) device, vision device (e.g., camera, etc.), a vehicle-to-vehicle communication device, or a combination thereof. Controller 30 may include an input/output interface 32 configured to receive input signals from sensors 28 and generate output signals that are used in controlling various devices and systems within vehicle 10 and may be provided to access control system 18. Interface 32 may receive and transmit signals over dedicated conductors or over a general purpose vehicle communications bus 24. Controller 30 may further include an electronic memory device 34 that stores input data, look up tables and other data structures, and software programs and an electronic processing device 36 (e.g., a microprocessor, a microcontroller, an application specific integrated circuit (ASIC), etc.) that executes instructions for software, firmware, programs, algorithms, scripts, etc. that are stored in memory device 34.

Access control system 16 controls access to vehicle 10 through a rear opening in vehicle 10. System 16 includes a rear closure 38 and a system 40 that controls movement of the rear closure 38.

Rear closure 38 controls access to a portion of vehicle 10 and fits over a rear opening of vehicle 10. In the illustrated embodiment, rear closure 38 comprises a lid that fits over a trunk in vehicle 10. It should be understood, however, that rear closure 38 may take on a variety of forms depending on the vehicle including, for example, deck lids that fit over openings providing access to storage compartments, liftgates, rear hatches or rear windows that fit over an opening providing access to a vehicle cabin of a passenger vehicle and tailgates that fit over an opening providing access to the bed of a truck. Rear closure 38 is configured to assume a closed position (shown in FIG. 1) preventing access to vehicle 10 through the rear opening and an open position permitting access to the vehicle through the rear opening. Rear closure 38 may be pivotally connected to the body of vehicle 10 for movement between the open and closed positions using hinges, multi-bar linkages, and other common mechanisms. Springs, struts and hydraulic or pneumatic cylinders may be used to assist in the opening of rear closure 38 and maintaining rear closure 38 in an open position. A lock assembly may be used to secure rear closure 38 in the closed position and may include a latch and various means including external and internal door handles and actuators that cause the latch to engage and disengage a striker. Rear closure 38 may also include one or more sensors 42 configured to generate impact signals indicative of impact by rear closure 38 with an object during movement of rear closure 38 from an open to a closed position or from a closed position to an open position.

System 40 controls movement of rear closure 38 from the closed position to the open position in order to permit access to the interior of vehicle 10 through the rear opening. In some embodiments, system 40 may comprise an OEM-installed (embedded) or aftermarket telematics unit 44 that is installed in the vehicle 10 and that enables wireless voice and/or data communication over a wireless carrier system and via wireless networking. Unit 44 may enable communication between vehicle 10 and a call center, other telematics-enabled vehicles, or some other entity or device. Unit 44 can therefore be used to provide a diverse range of vehicle services that involve wireless communication to and/or from the vehicle 10. Such services include: turn-by-turn directions and other navigation-related services that are provided in conjunction with a GPS-based vehicle navigation system; airbag deployment or collision notification and other emergency or roadside assistance-related services that are provided in response to signals received from various vehicle control modules; diagnostic reporting using information obtained from vehicle control modules or diagnostic modules; and infotainment-related services where music, webpages, movies, television programs, videogames and/or other information is downloaded by an infotainment system and is stored for current or later playback. The above-listed services are by no means an exhaustive list of all of the capabilities of telematics unit 44, but are simply an enumeration of some of the services that telematics unit 44 is capable of offering. Telematics unit 44 may include a user interface 46, a network communication module 48, a wireless communication module 50 and a controller 52.

User interface 46 enables vehicle occupants to access or initiate various services through telematics unit 44 and to provide and receive information from a call center, other telematics-enabled vehicles or other entity or device. Interface 46 may include any combination of hardware, software and/or other components that enable a vehicle occupant to exchange information or data through unit 44. The interface 46 may therefore include input components such as a microphone 54, one or more pushbuttons 56, a touch-screen display or other input device where user interface 46 receives information from a vehicle occupant, as well as output components like an audio system 58, a visual display 60, or an instrument panel, where user interface provides information to the vehicle occupant. Microphone 54 provides audio input to the telematics unit 44 to enable the driver or other occupant to provide voice commands and carry out hands-free calling. For this purpose, it can be connected to an on-board automated voice processing unit utilizing human-machine interface (HMI) technology known in the art. The pushbutton(s) 56 allow manual user input into the telematics unit 44 to initiate wireless telephone calls and provide other data, response, or control input. Separate pushbuttons 56 can be used for initiating emergency calls versus regular service assistance calls. The audio system 58 provides audio output to a vehicle occupant and can be a dedicated, stand-alone system or part of the primary vehicle audio system providing AM, FM and satellite radio, CD, DVD and other multimedia functionality. This functionality can be provided in conjunction with or independent of an infotainment system (not shown) Visual display 60 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation. Some components of the interface 46, such as microphone 54 and pushbuttons 56 may be connected directly to the telematics unit 44 whereas others are indirectly connected using one or more network connections, such as vehicle communications bus 24. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. Some or all components of user interface 60 may be mounted on the vehicle's rear view mirror.

Network communication module 48 includes a network interface configured for connection to a telecommunications network 62. Network 62 may comprise the public internet, a local area network (LAN), wide area network (WAN), virtual private network (VPN) or other form of telecommunications network. Network 62 may include a wireless carrier system such as a cellular telephone system 64 that includes a plurality of cell towers 66 or cellular base stations (only one shown), one or more mobile switching centers (MSCs) 68 and other networking components required to connect wireless carrier system with a land-based telecommunications network 70. Each cell tower 66 includes sending and receiving antennas and a base station, with the base stations from different cell towers being connected to the MSC 68 either directly or via intermediary equipment such as a base station controller. System 64 can implement any suitable communications technology, including for example, analog technologies such as AMPS, or the newer digital technologies such as CDMA (e.g., CDMA2000) or GSM/GPRS. As an alternative or in addition to cellular telephone system 64, the wireless carrier system may comprise a satellite communication system 72 that provides uni-directional or bi-directional communication with the vehicle 10. System 72 may include communication satellites 74 and an uplink transmitting station 76. Uni-directional communication can be, for example, satellite radio services, wherein programming content (news, music, etc.) is received by transmitting station 76, packaged for upload, and then sent to the satellite 74, which broadcasts the programming to subscribers. Bi-directional communication can be, for example, satellite telephony services using satellite 74 to relay telephone communications between the vehicle 10 and station 76.

Using the wireless carrier network, telematics unit 44 may be connected to network 70 and, through network 70, to various computing devices 78 and/or to a call center 80. Network 70 may be a conventional land-based telecommunications network that is connected to one or more landline telephones and connects the wireless carrier system to computing devices 78 and call center 80. For example, network 70 may include a public switched telephone network (PSTN) such as that used to provide hardwired telephony, packet-switched data communications, and the Internet infrastructure. One or more segments of network 70 could be implemented through the use of a standard wired network, a fiber or other optical network, a cable network, power lines, other wireless networks such as wireless local area networks (WLANs), or networks providing broadband wireless access (BWA), or any combination thereof. Computing devices 78 can be used for various purposes and may comprise, for example, service center computers where diagnostic information and other vehicle data can be uploaded from the vehicle via the telematics unit 44, client computers used by the vehicle owner or other subscriber for such purposes as accessing or receiving vehicle data or to setting up or configuring subscriber preferences or controlling vehicle functions, file servers to or from which vehicle data or other information is provided, web servers, or network address servers. Call center 80 may provide vehicle 10 with a number of different system back-end functions including connections to human advisors, an automated voice response system, databases, servers and the like used in providing, for example, emergency or roadside assistance services and vehicle diagnostic services.

According to one embodiment, network communication module 48 is used for cellular communication according to either GSM, CDMA, or LTE standards and therefore includes a standard cellular chipset for voice communications like hands-free calling, a wireless modem (not shown) for data transmission, and a radio transceiver 82 that transmits signals to and receives signals from a dual antenna 84 for wireless communication with network 62. It should be appreciated that the wireless modem can either be implemented through software that is stored in a memory in the telematics unit 44 and is executed by controller 52, or it can be a separate hardware component located internal or external to telematics unit 44. The modem can operate using any number of different standards or protocols such as LTE, EVDO, CDMA, GPRS, and EDGE. Transceiver 82 may communicate with cell towers 66 through antenna 84 using communication topologies including frequency, time and code division multiple access topologies (i.e. FDMA, TDMA, CDMA). Unit 44 establishes a communications channel (a voice channel and/or a data channel) with the wireless carrier system so that voice and/or data transmissions can be sent and received over the channel. Data can be sent either via a data connection, such as via packet data transmission over a data channel, or via a voice channel using techniques known in the art. For combined services that involve both voice communication (e.g., with a live advisor or voice response unit at the call center 80) and data communication (e.g., to provide GPS location data or vehicle diagnostic data to the call center 80), the unit 44 can utilize a single call over a voice channel and switch as needed between voice and data transmission over the voice channel, and this can be done using techniques known to those skilled in the art. When used for packet-switched data communication such as TCP/IP, telematics unit 44 can be configured with a static IP address or can set up to automatically receive an assigned IP address from another device on the network such as a router or from a network address server.

Wireless communication module 50 is configured for short range wireless communication with short range wireless communication devices used in or near vehicle 10 including embedded vehicle systems and portable communication devices carried by users of vehicle 10 such as a key fob 86 and a mobile communication device 88. In the illustrated embodiment, device 88 comprises a cellular phone and, in particular, a smart phone. Device 88 could also comprise, however, a tablet or laptop computer or any other portable device that is not mechanically connected to vehicle 10 and is configured for wireless communication with module 50. In general, the mobile communication device 88 includes hardware, software, and/or firmware enabling communications via short-range wireless communication (e.g., Wi-Fi Direct and Bluetooth) and may also enable cellular communications. The device 88 may further include various user interface elements including a display, a keypad (e.g., push button and/or touch screen), a microphone, one or more speakers, motion-detection sensors (such as accelerometers, gyroscopes, etc.), and a camera. The device 88 may include a processor and memory (e.g., non-transitory computer readable medium configured to operate with the processor) for storing software, firmware, etc. and the processor and memory may enable various software applications, which may be preinstalled or installed by the user (or manufacturer) (e.g., having a software application or graphical user interface or GUI). In accordance with one aspect of the present teachings, device 88 may be configured to implement a software application that enables the user to generate an actuation signal requesting a transition of the rear closure 38 from the closed position to the open position. Module 50 may communicate signals (such as the actuation signal) from short range wireless communication devices such as key fob 86 and device 88 to various vehicle systems (e.g., door locks or remote starting systems) for use in controlling those systems from key fob 86 or device 88. Module 50 also permits vehicle systems and mobile communications devices 88 to access telecommunications network 62 via network communication module 48. In this manner, telematics unit 44 may function as a wireless access point within vehicle 10 (i.e. a hotspot) for certain vehicle systems and mobile communications devices to access network 62.

Module 50 may include any combination of hardware, software and/or other components that enable wireless voice and/or data communication between module 50 and short range wireless communication devices such as key fob 86 and device 88 and, in particular, may include a wireless interface configured for short range wireless communication with key fob 86 and device 88. Module 50 may include a radio transceiver 90 configured for short range wireless communication with key fob 86 and device 88 over an antenna 92 using short-range wireless technologies such as Wi-Fi (IEEE 802.11), WiMAX, Wi-Fi direct, Bluetooth, Zigbee, near field communication (NFC), etc. In some embodiments, module 50 includes a chipset configured to implement Bluetooth low energy (BLE) communication protocols. Bluetooth wireless technology allows two Bluetooth devices such as module 50 and device 88 to be "paired" during an initial communication and to thereafter automatically reestablish a communication link or channel to communicate with one another and exchange information without further action by a user of module 50 or device 88. During an initial communication, module 50 and device 88 are paired by exchanging their unique Bluetooth addresses and possibly other information which is then stored on module 50 and device 88. If the communication ends (e.g., because device 88 is moved further away from module 50 when a user leaves vehicle 10 and enters a store), module 50 may broadcast inquiries to determine whether device 88 (or another paired device) has returned and/or is within the transmission range of module 50 and, if so, automatically reestablish a communications link or channel between module 50 and device 88 without having to again pair module 50 and device 88.

Controller 52 is provided to control and manage communications among interfaces 62, 64, vehicle communications bus 24 and potentially dedicated hardwired connections within vehicle 10. In accordance with the present teachings, controller 52 may also be configured to control the position of rear closure 38 responsive to communications received through modules 48 and/or 50. Controller 52 may include a variety of electronic processing devices, memory devices, input/output (I/O) devices, and/or other known components, and may perform various control and/or communication related functions. In an exemplary embodiment, controller 52 includes an electronic memory device 94 that stores various look up tables or other data structures and software programs, etc. Controller 52 may also include an electronic processing device 96 (e.g., a microprocessor, a microcontroller, an application specific integrated circuit (ASIC), etc.) that executes instructions for software, firmware, programs, algorithms, scripts, etc. that are stored in memory device 94. Controller 52 may be a dedicated controller used only for telematics unit 44 or can be shared with other vehicle systems. It should also be understood that, while module 50 and controller 52 are illustrated as part of telematics unit 44 in the illustrated embodiment, module 50 and controller 52 could be part of a separate communications unit. Controller 52 may be electronically connected to other vehicle devices, modules and systems via vehicle communications bus 24 or other communication means and can interact with them when required.

In accordance with one embodiment controller 52 may be configured with appropriate programming instructions or code (i.e., software) to perform several steps in a method for controlling access to vehicle 10. The code may be stored in memory device 94 of controller 52 and may be uploaded to memory device 94 from a conventional computer storage medium.

Figure 2:
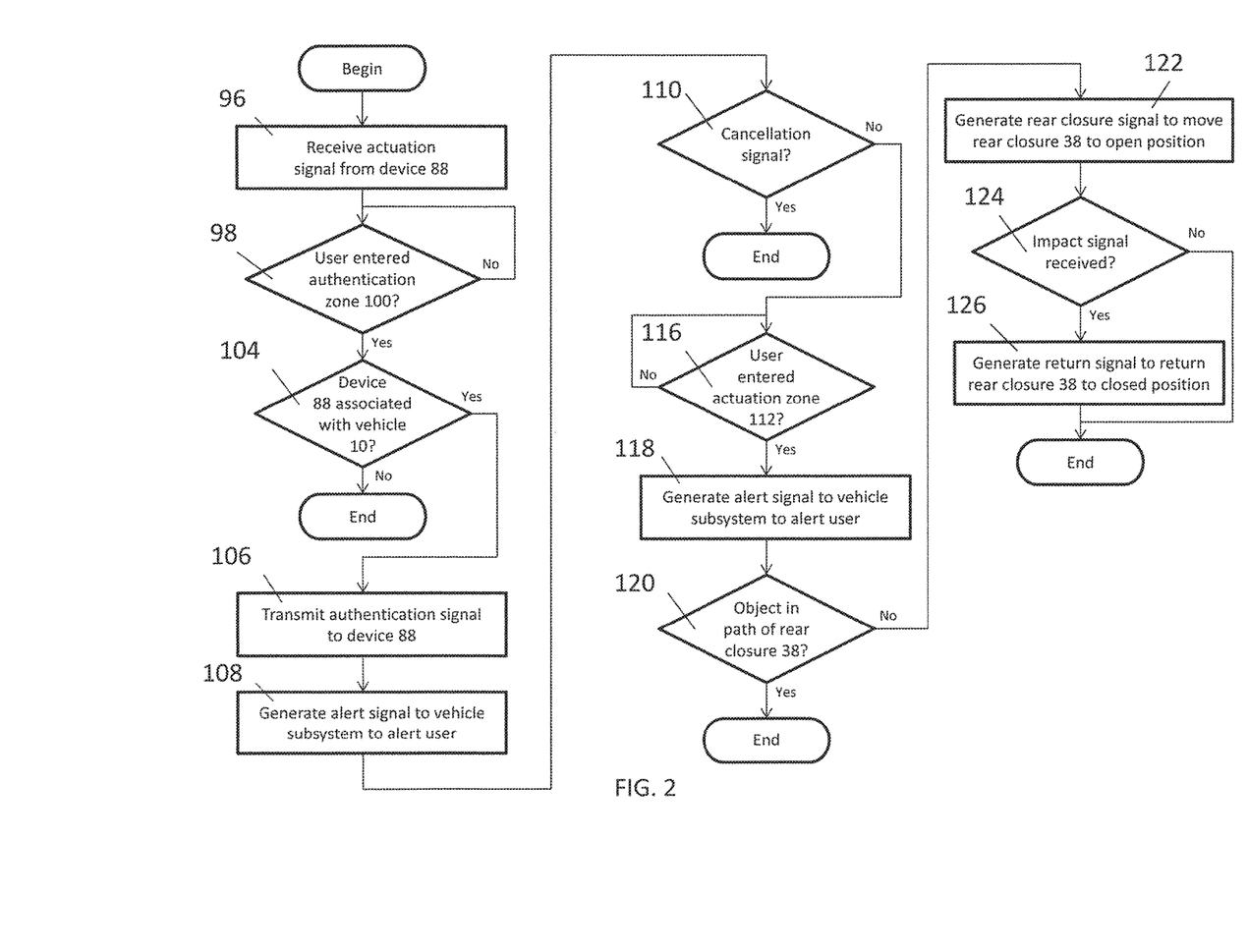
FIG. 2 is a flowchart diagram illustrating one embodiment of a method for controlling access to a vehicle in accordance with the present teachings.

Referring now to FIG. 2, the method may include the step 96 receiving an actuation signal from a mobile communication device 88 carried by a user of vehicle 10. The actuation signal represents a vehicle user's request to transition rear closure 38 from the closed position to the open position. The actuation signal may be generated by device 88 in response to a command from the user entered through an input device (e.g., a touch screen) on device 88. The signal may be generated through a network interface on device 88 for transmission over a telecommunications network 62 and/or through a wireless interface on device 88 for transmission over a short-range wireless communication channel. Device 88 may include a specific software application that when activated by the user generates the actuation signal. A user that expects to load goods purchased from a store into vehicle 10 may, for example, activate the application while in line submitting payment for the goods. When the actuation signal is initially generated, the user may be outside of the communication range of module 50. In some embodiments, the actuation signal may therefore be sent to vehicle 10 via telecommunications network 62 and thus received via module 48. In cases where module 50 is not always active (such as being inactive when the vehicle ignition is off), the actuation signal may cause controller 52 to activate (wake up) module 50 so that module 50 is prepared to communicate with short range wireless communication devices such as key fob 86 or device 88 carried by the user when the user is within range of transceiver 90. In other embodiments, transmission of the actuation signal by device 88 may be held (delayed) until the user is within range of vehicle 10 (e.g., within an authentication zone described below) and then only sent via short range wireless communication using module 50. The actuation signal may remain active for a predetermined period of time. For example, device 88 may cease generating the actuation signal if the device 88 does not reach the vehicle 10 within a predetermined period of time (e.g., if the user decides to continue shopping for additional goods). Alternatively, the actuation signal may remain active until a predefined event occurs such as receipt by device 88 of an acknowledgement from system 16 of receipt of the actuation signal.

The method may continue with the step 98 of determining that the user has entered an authentication zone 100 located within an authentication distance 102 from vehicle 10. The position of the user relative to vehicle 10 may be determined via communication between module 50 and one or more short range wireless communication devices carried by the user such as key fob 86 or mobile communication device 88. In one embodiment, module 50 includes three antennas 92 sufficient to allow controller 52 to identify the location of a device carried by the user using conventional triangulation methods. In another embodiment module 50 may be configured to determine the location of the user based on the signal strength of signals generated by a device carried by the user or the arrival time of those signals.

Once it is determined that the user has entered the authentication zone 100, the method may continue with steps to authenticate device 88 and provide an opportunity for the user to withdraw his or her initial instruction to transition the rear closure 38 to an open position. In step 104, controller 52 may determine whether device 88 is associated with vehicle 10. As discussed hereinabove, in one embodiment module 50 is configured to implement Bluetooth low energy communication. Accordingly, controller 52 may determine whether device 88 is paired with system 16. It should be understood, however, that a variety of authentication mechanisms could be implemented. If controller 52 determines that device 88 is associated with vehicle 10, controller 52 may, in step 106, generate an authentication signal to device 88. In certain embodiments, the authentication signal is configured to cause a reaction in device 88 that can be detected by the user. For example, the authentication signal may cause a haptic actuator in device 88 to generate a haptic (vibratory) alert that can be felt by the user or cause a speaker to generate an audio alert that can be heard by the user. The alert provided to the user is intended to reminder the user of the prior instruction to open the rear closure 38 and thereby provide an opportunity for the user to withdraw the instruction.

In addition to generating a reminder of the instruction through device 88, controller 52 may be configured to generate a reminder using one or more components of vehicle 10. Accordingly, in step 108, controller 52 may generate an alert signal to a vehicle subsystem such as body control module 12 that is capable producing an audio or visual alert. As discussed hereinabove, module 12 may be configured to control the vehicle horn 18 and/or exterior lights 20. Controller 52 may therefore generate an alert signal to module 12 (or a dedicated control system for horn 18 or lights 20) to cause module 12 to activate the horn 18 or lights 20 and provide an audio or visual reminder to the user of the prior instruction to open the rear closure 38 and again provide an opportunity for the user to withdraw the instruction.

Following generation of the authentication and alert signals, controller 52 may, in step 110, be configured to monitor for a cancellation signal generated by device 88 while device 88 is still in the authentication zone 100. The cancellation signal may be received by module 50. The user may use the same software application referenced above to generate the cancellation signal by entering a command through an input device on device 88. The cancellation signal may be a specifically configured signal or may simply be the termination of the actuation signal referenced hereinabove. If controller 52 receives the cancellation signal, controller 52 may be configured to perform various steps to terminate the process of opening rear closure 38. In addition to preventing generation of any signals required to open rear closure 38, controller 52 may, for example, take steps to deactivate module 50.

Referring again to FIG. 1, assuming that the user does not cancel the user's earlier instruction, the user's continued progress towards vehicle 10 will eventually result in entry to an actuation zone 112 located within an actuation distance 114 from vehicle 10. The actuation zone 112 is located within the authentication zone 100 and the actuation distance 114 is less than the authentication distance 102. In one embodiment, the authentication distance may equal about thirty (30) meters while the actuation distance equals about five (5) meters. In other embodiments, the authentication distance may equal the maximum transmission distance for communication between device 88 and module 50 based on the wireless communication technology being implemented while the actuation distance may equal some distance less than the authentication distance. Referring again to FIG. 2, in step 116, controller 52 determines that the user has entered the actuation zone 112. Controller 52 may again make this determination via communication between module 50 and one or more short range wireless communication devices carried by the user such as key fob 86 or mobile communication device 88 using techniques similar to those described hereinabove. Controller 52 may also make the determination based on an estimated time elapsed since detecting entry of the user into the authentication zone 100. The time may be based on an average user's walking gate as an estimate of how long it would take to go from entry into the authentication zone 100 to entry into the actuation zone 112.

Once the user has entered the actuation zone 112, controller 52 may, in step 118, again generate an alert signal to a vehicle subsystem such as body control module 12 that is capable of producing an audio or visual alert to the user of device 88. Controller 52 may therefore generate an alert signal to module 12 (or a dedicated control system for horn 18 or lights 20) to cause module 12 to activate the horn 18 or lights 20 and provide an audio or visual reminder to the user of the prior instruction to open the rear closure 38. This reminder is intended to serve as a warning to the user that the rear closure 38 is about to open (and that any prior attempted cancellation instruction was not generated or received) so that the user remains clear of path of movement of the rear closure 38.

Prior to opening rear closure 38, controller 52 may also be configured in step 120 to receive a warning signal from collision avoidance system 14 indicating that an object is in the path of movement of the rear closure 38 from the closed position to the open position. System 14 may determine that, based on the output of sensor 28, that a person or object is in the intended path of movement of rear closure 38. System 14 may therefore generate a warning signal to controller 52 that enables controller 52 to terminate the opening process.

Assuming that no warning signal is received, the method may continue with the step 122 of generating a rear closure signal. The rear closure signal is configured to cause rear closure 38 to move from the closed position the open position. Controller 52 generates the rear closure signal 38 which may cause an actuator (not shown) to move rear closure 38 to an open position. The access control system 16 may continue to monitor the surrounding area for potential objects in the path of movement of rear closure 38 during movement from the closed position to the open position. In addition to potential warning signals from collision avoidance system 14, obstruction sensors 42 on rear closure 38 may generate an impact signal if the rear closure 38 strikes an object during movement. Accordingly, in steps 124, 126, controller 52 may receive an impact signal generated by sensor 42 and generate a return signal in response, the return signal configured to cause rear closure 38 to return to the closed position. The return signal may also be provided to the actuator that causes movement of rear closure 38.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although the illustrated embodiment has been shown and described in connection with a rear closure such as a liftgate, it will be appreciated that the above-described system and method may be used also or instead for any vehicle closure, such as driver and/or passenger side doors. All such other embodiments, changes, and modifications are intended to come within the scope of the invention defined by the appended current and/or future claims unless those claims expressly recite a limitation to a specific vehicle closure.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An access control system for a vehicle, comprising:
a rear closure that fits over a rear opening of a vehicle and that is configured to assume a closed position preventing access to the vehicle through the rear opening and an open position permitting access to the vehicle through the rear opening;

a system that controls movement of the rear closure between the closed position and the open position, the system including a wireless communication module having a wireless interface configured for short range wireless communication; and, a controller configured to receive an actuation signal transmitted from a mobile communication device located outside of the range of the wireless interface and carried by a user of the vehicle, the actuation signal requesting transition of the rear closure from the closed position to the open position;

determine, after receiving the actuation signal, that the user has entered an authentication zone located within an authentication distance from the vehicle;

determine, after determining that the user has entered the authentication zone, that the user has entered an actuation zone located within an actuation distance from the vehicle, the actuation distance being less than the authentication distance; and, generate a rear closure control signal once the user is determined to be within the actuation zone, the rear closure control signal configured to cause the rear closure to move from the closed position to the open position wherein the controller is configured to carry out at least one of determining that the user has entered the authentication zone and determining that the user had entered the actuation zone via communication between the wireless communication module and a short range wireless communication device carried by the user.

2. The access control system of claim 1 wherein the system that controls movement of the rear closure further includes a network interface configured for wireless communication with the mobile communication device over a telecommunications network, the controller receiving the actuation signal through the network interface.

3. The access control system of claim 1 wherein the controller is further configured to:

determine whether the mobile communication device is associated with the vehicle; and, generate an authentication signal to the mobile communication device if the mobile communication device is associated with the vehicle, the authentication signal configured to cause the mobile communication device to activate at least one of an audio alert and a haptic alert.

4. The access control system of claim 1 wherein the controller is further configured to generate an alert signal to a vehicle subsystem once the user is within the authentication zone, the vehicle subsystem configured to produce at least one of an audio alert and a visual alert and the alert signal configured to cause the vehicle subsystem to generate the at least one of the audio alert and the visual alert.

5. The access control system of claim 1 wherein the controller is further configured to generate an alert signal to a vehicle subsystem once the user is within the actuation zone and before generating the rear closure control signal, the vehicle subsystem configured to produce at least one of an audio alert and a visual alert and the alert signal configured to cause the vehicle subsystem to generate the at least one of the audio alert and the visual alert.

6. The access control system of claim 1 wherein the controller is further configured to:

receive an impact signal generated by a sensor when the rear closure impacts an object during movement of the rear closure from the closed position to the open position; and, generate a return signal upon receipt of the impact signal, the return signal configured to cause the rear closure to return to the closed position.

7. The access control system of claim 1 wherein the short range wireless communication device is a component of the mobile communications device.

8. The access control system of claim 1 wherein the short range wireless communication device is separate from the mobile communications device.

9. An access control system for a vehicle, comprising:

a rear closure that fits over a rear opening of a vehicle and that is configured to assume a closed position preventing access to the vehicle through the rear opening and an open position permitting access to the vehicle through the rear opening;

a system that controls movement of the rear closure between the closed position and the open position, the system including a wireless communication module having a wireless interface configured for short range wireless communication; and, a controller configured to receive an actuation signal transmitted from a mobile communication device located outside of the range of the wireless interface and carried by a user of the vehicle, the actuation signal requesting transition of the rear closure from the closed position to the open position;

determine, after receiving the actuation signal, that the user has entered an authentication zone located within an authentication distance from the vehicle;

generate an alert signal to a vehicle subsystem once the user is within the authentication zone, the vehicle subsystem configured to produce an audio or visual alert and the alert signal configured to cause the vehicle subsystem to generate the audio or visual alert;

monitor for a cancellation signal generated by the mobile communication device while the mobile communication device is in the authentication zone;

determine, after determining that the user has entered the authentication zone, that the user has entered an actuation zone located within an actuation distance from the vehicle, the actuation distance being less than the authentication distance; and, generate, in the absence of the cancellation signal, a rear closure control signal once the user is determined to be within the actuation zone, the rear closure control signal configured to cause the rear closure to move from the closed position to the open position, wherein the controller is configured to carry out at least one of determining that the user has entered the authentication zone and determining that the user had entered the actuation zone via communication between the wireless communication module and a short range wireless communication device carried by the user.

10. The access control system of claim 9 wherein the system that controls movement of the rear closure further includes a network interface configured for wireless communication with the mobile communication device over a telecommunications network, the controller receiving the actuation signal through the network interface.

11. The access control system of claim 9 wherein the controller is further configured to:
   determine whether the mobile communication device is associated with the vehicle; and,
   generate an authentication signal to the mobile communication device if the mobile communication device is associated with the vehicle, the authentication signal configured to cause the mobile communication device to activate at least one of an audio alert and a haptic alert.

12. The access control system of claim 9 wherein the controller is further configured to generate an alert signal to a vehicle subsystem once the user is within the actuation zone and before generating the rear closure control signal, the vehicle subsystem configured to produce at least one of an audio alert and a visual alert and the alert signal configured to cause the vehicle subsystem to generate the at least one of the audio alert and the visual alert.

13. The access control system of claim 9 wherein the first controller is further configured to:
   receive an impact signal generated by a sensor when the rear closure impacts an object during movement of the rear closure from the closed position to the open position; and,
   generate a return signal upon receipt of the impact signal, the return signal configured to cause the rear closure to return to the closed position.

14. An access control system for a vehicle, comprising:
   a rear closure that fits over a rear opening of a vehicle and that is configured to assume a closed position preventing access to the vehicle through the rear opening and an open position permitting access to the vehicle through the rear opening;
   a collision avoidance system configured to determine whether an object is located in the path of movement of the rear closure between the closed position and open position;
   a system that controls movement of the rear closure between the closed position and the open position, the system including
      a wireless communication module having a wireless interface configured for short range wireless communication; and,
      a controller configured to
         receive an actuation signal transmitted from a mobile communication device located outside of the range of the wireless interface and carried by a user of the vehicle, the actuation signal requesting transition of the rear closure from the closed position to the open position;
         determine, after receiving the actuation signal, that the user has entered an authentication zone located within an authentication distance from the vehicle;
         determine, after determining that the user has entered the authentication zone, that the user has entered an actuation zone located within an actuation distance from the vehicle, the actuation distance less than the authentication distance;
         receive a warning signal from the collision avoidance system if the object is in the path of movement of the rear closure from the closed position to the open position; and,
         generate, in the absence of the warning signal, a rear closure control signal once user is determined to be within the actuation zone, the rear closure control signal configured to cause the rear closure to move from the closed position to the open position,
   wherein the controller is configured to carry out at least one of determining that the user has entered the authentication zone and determining that the user had entered the actuation zone via communication between the wireless communication module and a short range wireless communication device carried by the user.

15. The access control system of claim 14 wherein the system that controls movement of the rear closure further includes a network interface configured for wireless communication with the mobile communication device over a telecommunications network, the controller receiving the actuation signal through the network interface.

16. The access control system of claim 14 wherein the controller is further configured to:
   determine whether the mobile communication device is associated with the vehicle; and,
   generate an authentication signal to the mobile communication device if the mobile communication device is associated with the vehicle, the authentication signal configured to cause the mobile communication device to activate at least one of an audio alert and a haptic alert.

17. The access control system of claim 14 wherein the controller is further configured to generate an alert signal to a vehicle subsystem once the user is within the authentication zone, the vehicle subsystem configured to produce at least one of an audio alert and a visual alert and the alert signal configured to cause the vehicle subsystem to generate the at least one of the audio alert and the visual alert.

18. The access control system of claim 14 wherein said controller is further configured to:
   receive a cancellation signal from the mobile communication device when the mobile communication device is within the authentication zone, but not within the actuation zone; and,
   prevent generation of the rear closure control signal upon receipt of the cancellation signal.

19. The access control system of claim 14 wherein the controller is further configured to generate an alert signal to a vehicle subsystem once the user is within the actuation zone and before generating the rear closure control signal, the vehicle subsystem configured to produce at least one of an audio alert and a visual alert and the alert signal configured to cause the vehicle subsystem to generate the at least one of the audio alert and the visual alert.

20. The access control system of claim 14 wherein the first controller is further configured to:
   receive an impact signal generated by a sensor when the rear closure impacts an object during movement of the rear closure from the closed position to the open position; and,
   generate a return signal upon receipt of the impact signal, the return signal configured to cause the rear closure to return to the closed position.

* * * * *